United States Patent [19]

Strickland et al.

[11] Patent Number: 5,956,024
[45] Date of Patent: *Sep. 21, 1999

[54] GRAPHICAL USER INTERFACE FOR CUSTOMER SERVICE REPRESENTATIVES FOR SUBSCRIBER MANAGEMENT SYSTEMS

[75] Inventors: Marshall Strickland; Rob Strickland, both of Boston, Mass.

[73] Assignee: Continental Cablevision, Inc., Boston, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/659,323

[22] Filed: Jun. 6, 1996

Related U.S. Application Data

[60] Provisional application No. 60/002,045, Aug. 8, 1995.

[51] Int. Cl.⁶ .................................................... G06F 9/00
[52] U.S. Cl. .............................................. 345/327; 348/8
[58] Field of Search .................................. 345/326, 327, 345/329; 348/8, 10, 12, 13

[56] References Cited

U.S. PATENT DOCUMENTS

| | | | |
|---|---|---|---|
| Re. 32,632 | 3/1988 | Atkinson | 345/146 X |
| 4,698,624 | 10/1987 | Barker | 345/157 |
| 4,772,882 | 9/1988 | Mical | 345/146 |
| 5,115,504 | 5/1992 | Belove | 707/100 |
| 5,185,857 | 2/1993 | Rozmanith | 707/509 |
| 5,204,947 | 4/1993 | Bernstein | 345/357 |
| 5,220,675 | 6/1993 | Padawer | 345/333 |
| 5,262,761 | 11/1993 | Scandura | 345/346 X |
| 5,297,249 | 3/1994 | Bernstein | 345/356 |
| 5,307,086 | 4/1994 | Griffin | 345/146 |
| 5,309,509 | 5/1994 | Cocklin | 379/165 |
| 5,317,687 | 5/1994 | Torres | 345/349 |
| 5,335,320 | 8/1994 | Iwata | 395/704 |
| 5,347,627 | 9/1994 | Hoffmann | 345/334 |
| 5,347,629 | 9/1994 | Barrett | 345/334 |
| 5,349,658 | 9/1994 | O'Rourke | 345/349 |
| 5,371,844 | 12/1994 | Andrew | 345/334 |
| 5,374,924 | 12/1994 | McKiel, Jr. | 345/340 X |
| 5,384,910 | 1/1995 | Torres | 345/352 |
| 5,388,202 | 2/1995 | Squires | 345/334 |
| 5,404,441 | 4/1995 | Satoyama | 345/334 |
| 5,414,806 | 5/1995 | Richards | 345/349 X |
| 5,414,836 | 5/1995 | Baer | 395/183.14 |
| 5,416,508 | 5/1995 | Sakuma et al. | 348/10 |
| 5,416,890 | 5/1995 | Beretta | 345/440 X |
| 5,424,140 | 6/1995 | Bloomfield . | |
| 5,430,836 | 7/1995 | Wolf | 345/335 |
| 5,436,637 | 7/1995 | Gayraud | 345/346 |
| 5,524,195 | 6/1996 | Clanton, III et al. | 395/327 |
| 5,539,822 | 7/1996 | Lett | 348/13 |
| 5,592,212 | 1/1997 | Handelman | 348/8 |

*Primary Examiner*—Raymond J. Bayerl
*Assistant Examiner*—Cao H. Nguyen
*Attorney, Agent, or Firm*—Stephen C. Glazier

[57] ABSTRACT

The present invention is a graphical user interface ("GUI") for customer service representatives ("CSRs") for subscriber management systems ("SMS") for telecommunications service providers, including cable television multiple system operators ("MSOs"). A screen is provided with menus of icons for various functions at the customer service workstation ("CSW") for the CSRs. Sections of the screen provide presentation of various data to the CSR from the SMS.

12 Claims, 4 Drawing Sheets

GRAPHICAL USER INTERFACE FOR CUSTOMER SERVICE REPRESENTATIVES FOR SUBSCRIBER MANAGEMENT SYSTEMS

This regular U.S. patent application is filed claiming the priority of U.S. Provisional application No. 60/002,045, filed Aug. 8, 1995, of the same title.

1. FIELD OF INVENTION

The present invention is in the field of graphical user interfaces ("GUIs"). More specifically, the present invention involves a GUI for customer service representatives ("CSRs") for subscriber management systems ("SMS") for cable television, high-speed data, and telecommunications user account information. One embodiment of the invention is specifically a GUI for cable television system customer service representatives ("CSRs") for the SMS for the cable company.

2. BACKGROUND OF THE INVENTION

Subscriber management systems for cable television, high-speed data, and telecommunications services exist in the prior art; however, these prior art SMSs do not have GUIs. GUIs exist for a variety of software systems in the prior art; however, the prior art has no GUI for subscriber management systems for cable television, high-speed data and telecommunications.

Existing SMSs for telecommunications do not use GUIs, but instead use keyboard based interfaces with complicated command codes that make it difficult for the interfaces to be used. This increases training costs and decreases the effectiveness of the CSR who is using the SMS. This raises a particular difficulty in real time responsiveness of the CSR when the CSR is dealing with a customer. With the currently existing SMSs, the CSR is distracted by the difficulty of using the SMS, and cannot give full attention to the customer, and the CSR is more likely to fail to obtain the information required in interacting with the customer.

This point of customer relations is a newly perceived problem because of the newly competitive market for telecommunications services. As telecommunications customers in cable television, telephone and other telecommunications services have an increasing number of choices of service providers, the customers may choose to change service providers based on the customer's perception of a faulty or inadequate response by the CSR. Consequently, the competitive environment is recently putting pressure on telecommunications companies to increase customer satisfaction by increasing the effectiveness of CSR interaction with customers on the telephone.

3. SUMMARY OF THE INVENTION

The inventor of the present invention has conceived for the first time that one way to solve this new problem of CSR effectiveness with customers on the telephone is to upgrade the facility and functionality of the user interface of the SMS with the CSR. This would allow the CSR to more successfully deal with the SMS while giving more attention to the customer.

It is an object of the present invention to upgrade the user interface of the SMS with the CSR for telecommunications service providers. This is done by the present invention by providing a GUI for the CSR for an SMS for telecommunications service providers and other companies. In particular, it is an object of the present invention to provide a GUI for the CSR for SMS for a cable television MSO ("multiple systems operator"). It is a further object of the present invention to provide a user interface for a CSR with an SMS that is easier to use, and less distracting, and provides superior access to the SMS for the CSR. It is a further object of the present invention to provide a user interface that requires less training for the CSR while allowing the CSR to provide superior service. It is also an object of the present invention to provide the CSR with greater competitive performance in order to provide a competitive edge for the telecommunications company or the cable MSO in the newly competitive telecommunications market. It is also an object of the present invention to provide the CSR with integrated use of the telephone switch (for the origination of the customer call), company video streams (to allow the CSR to see what the customer sees on its television), the Internet (to send and receive electronic mail or bill images), and marketing information.

The present invention is a GUI for a CSR for an SMS for telecommunications companies, and specifically for the cable television MSO.

In one embodiment, the present invention is a GUI overlay to an existing SMS. This is an application that runs on the CSR customer service workstation ("CSW") without providing additional functionality to the existing SMS. In other embodiments, the present invention is a GUI application running on a CSW communicating with an existing SMS through an Ethernet network, while also interacting with other unrelated servers and communication channels for the CSR, in effect adding functionality for the CSR in addition to the SMS.

The present invention provides a series of point-and-click screens with menus of icons for various functions. Sections of the screens provide presentations of various data to the CSR from the SMS.

The present invention provides a reduction of CSR training time; a reduction of CSR per-call handling time; an improvement in customer access to the CSRs and the SMS; a refocusing of CSR training and CSR performance goals on customer service and sales expertise, and away from the detailed technical requirements of handling an old style non-graphical user interface for the SMS; an increased resolution of customer needs in the first call from the customer; increased sales as a result of an imbedded system marketing prompt in the GUI; and a reduction in the number of on-site customer visits required to obtain customer satisfaction.

4. BRIEF DESCRIPTION OF THE DRAWINGS

The present invention may be better understood with reference to the detailed description herein together with the following figures, where like numerals denote identical elements.

5. DETAILED DESCRIPTION OF THE PREFERRED EMBODIMENT

5.1 The Figures

Figure 1:
FIG. 1 is an example of a screen display of the present invention.
Figure 3:
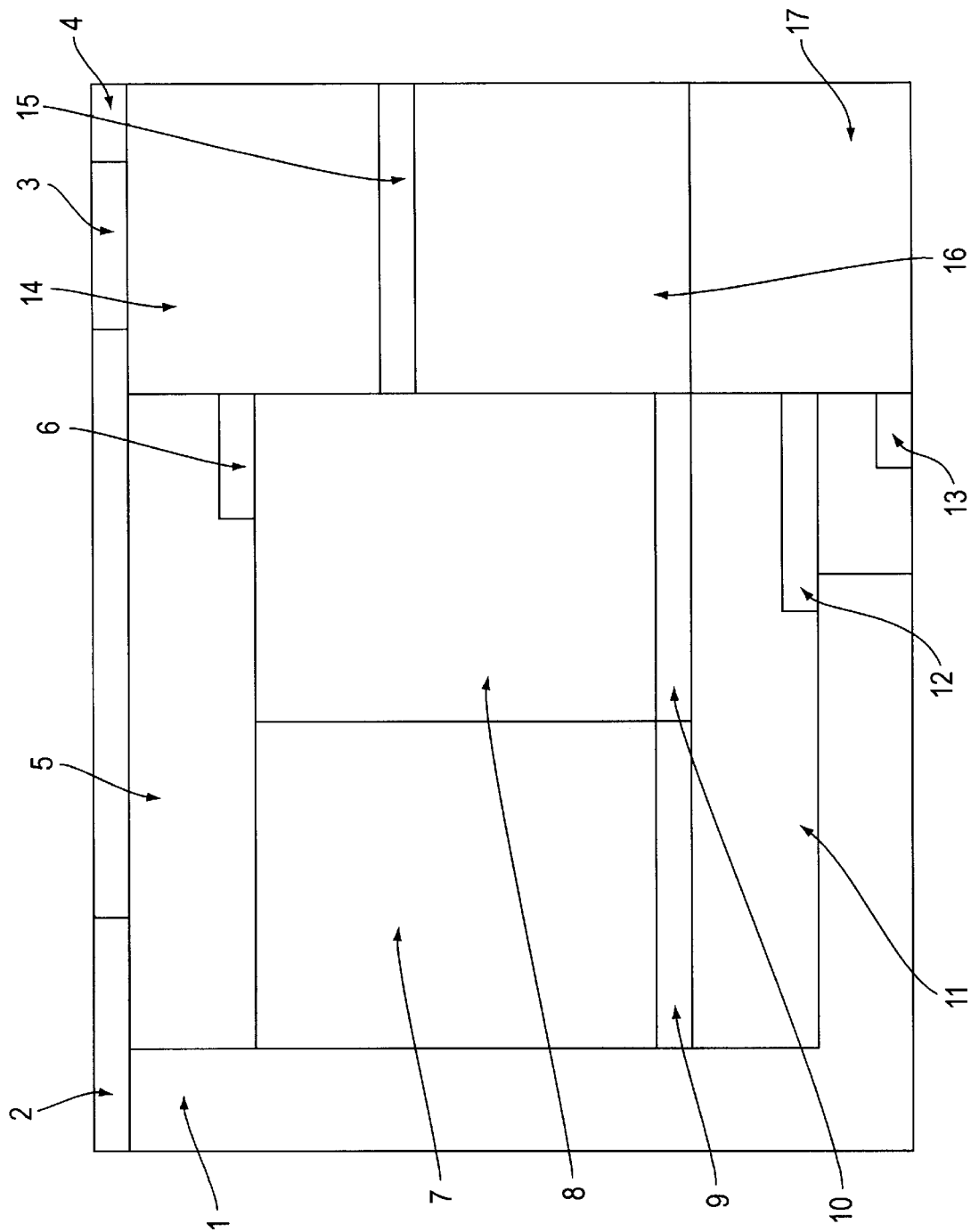
FIG. 3 is a block diagram of the fields in the screen display shown in FIG. 1.

FIG. 1 is an example of a screen display of the present invention. FIG. 3 is a block diagram of the fields in the same screen. A field of icons 1 contains a variety of icons, and each icon represents a function. Pointing and clicking on an icon activates the corresponding function.

Field 2 is a bar of common activity menus. Clicking on one of these menus brings up a corresponding menu window.

Field 3 displays the day and time.

Field 4 contains two buttons that activate a help function and window sizing function, respectively.

Field 5 is a range of data windows, which may be used to display or input specific account identification data types, as shown in FIG. 1 in this field.

Field 6 is a button which, when clicked on, brings up further data.

Fields 7 and 8 show additional data windows for displaying and inputting account information. Here Field 7 is for billing information, and Field 8 is for services and equipment.

Fields 9 and 10 each contain four buttons which, when clicked on, each activate the indicated functions or call up the indicated information regarding the account being displayed, including view bill, payment, collection, arrangement, CATV, PPV/VOD, interactive and disconnect information.

Field 11 contains a further data window for the account, this one for the account service log.

Field 12 contains two more buttons to call up further information and activate further functions, including view W/U and schedule information.

Field 13 contains left and right screen scroll buttons.

Field 14 contains the Advisor information display areas, which display suggests dialogues for the CSR to use, and hints to deal with specific situations indicated by the CSR, as well as "just-in-time" training information for CSRs delivered at the exact moment it is required.

Field 15 contains three buttons to call up other types of Advisor text to be displayed to the CSR.

Field 16 contains the marketing information display areas to inform the CSR as to what marketing opportunities may be of most interest to the customer with whom the CSR is currently speaking.

Field 17 contains an information display area of important and timely information that may be of interest for the CSR to tell to the customer with whom the CSR is speaking.

Figure 2:
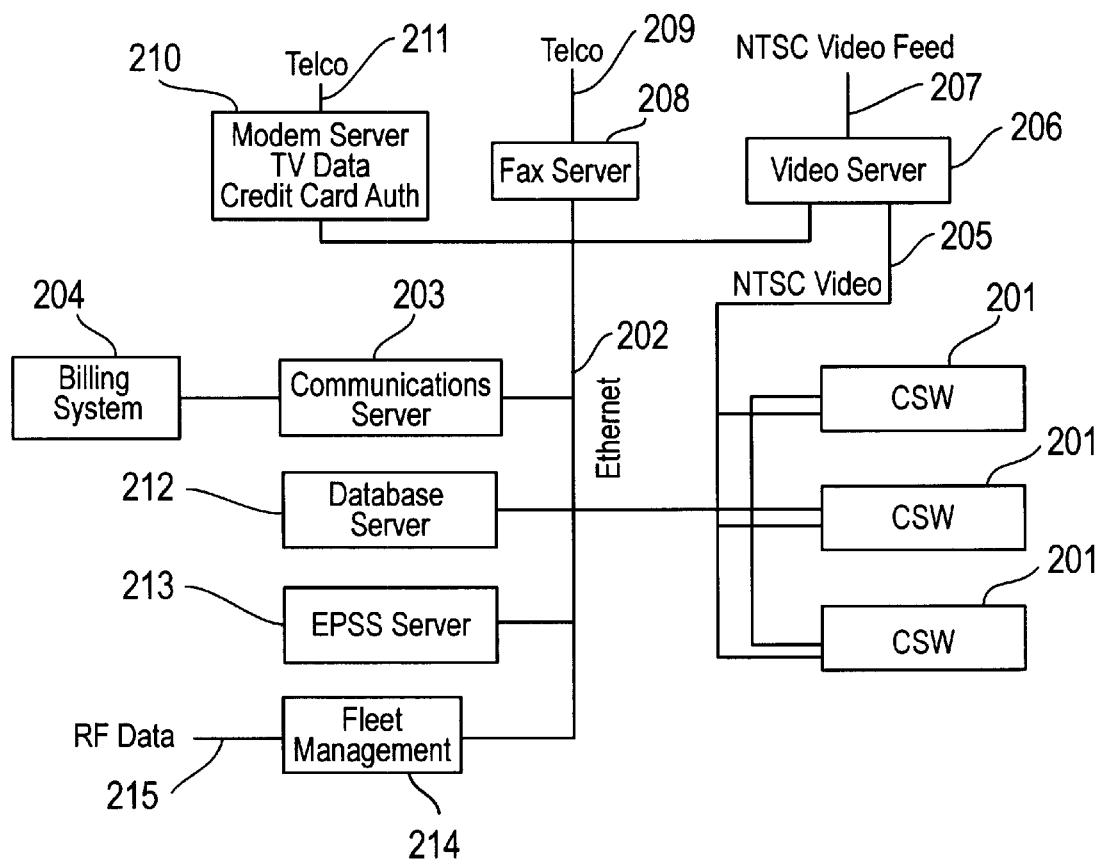
FIG. 2 is an example of the customer service workstation architecture in one embodiment of the present invention.

FIG. 2 is an example of the CSR workstation architecture in one embodiment of the present invention. A plurality of CSWs 201 communicates through an Ethernet LAN or WAN 202, to a communications server 203, to a billing system 204. The billing system 204 may be an SMS, or more specifically, a Subscriber Account Management ("SAM") system.

The CSWs 201 may also communicate through an NTSC video link 205 to a video service 206, with an NTSC Video Feed 207.

The CSWs 201 may also communicate to other elements through the Ethernet LAN or WAN 202. These other elements may include a fax server 208 with a telco link 209, a modem server for TV schedule data and credit card authorization 210 with a telco link 211, a database server 212, an EPSS server 213, a fleet management Unix server 214 with an RF data link 215, and other elements (not shown). The Ethernet network 202 may be a high speed network or may interface with a bridge 221 to a high speed (broadband) network. This may provide additional functionality, such as an Internet feed to the GUI.

Figure 4:
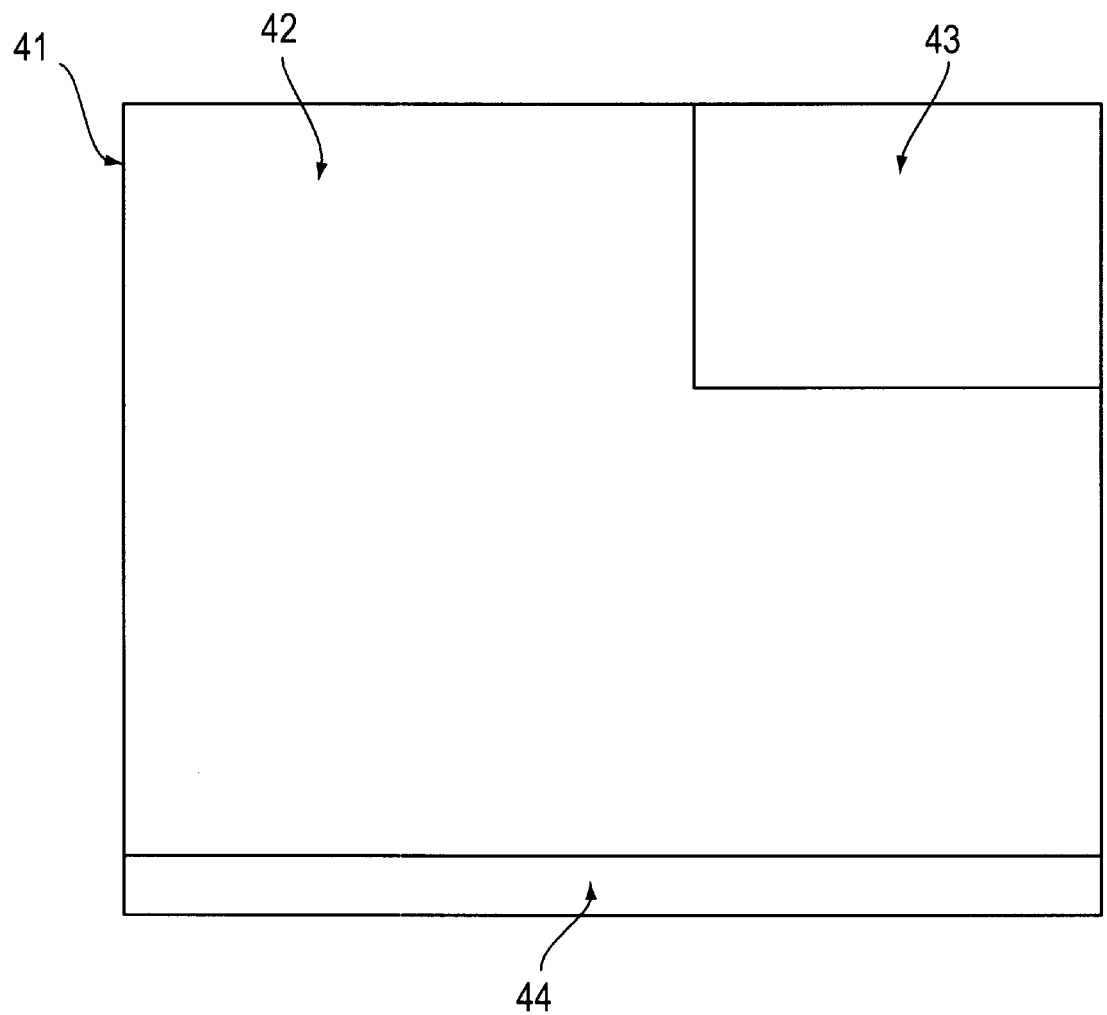
FIG. 4 is a block diagram of the fields in an alternative screen display.

FIG. 4 is a block diagram of the fields in an alternative screen display of the present invention. The complete screen display 41, contains a small television picture 43, and a moving ticker read-out 44 at the bottom of the screen, displaying various current statistics to the user regarding user performance, system performance, and other special information. These statistics can identify performance parameters such as the number of calls by the user answered and the number of calls on hold for the user. The main body 42 of the screen can contain all or part of the fields indicated in FIG. 3.

5.2 The SAM Embodiment

The assignee of the present invention, Continental Cablevision, Inc., has developed and is continuing to modify and improve an SMS, which is sometimes referred to as its subscriber account management system or "SAM." The assignee's SAM is the subject of currently pending U.S. patent application Ser. No. 08/401,602, entitled "Telecommunications User Account Management System and Method," filed Mar. 9, 1995.

One embodiment of the present invention is a GUI software application running as an overlay on CSWs of the existing SAM system. This embodiment of the present invention runs as a software application on the existing hardware and software platform provided with the existing CSWs.

This embodiment, or another embodiment of the present invention with a distinct architecture, provides various functions, as detailed below. Embodiments may be provided with all these functions, or with less than all these functions.

Office Information. For this function, the CSR inputs a customer's corporate name and the desired information about the company. The GUI then presents the corresponding office listing, office hours, and travel directions.

Cable Guide. The CSR inputs the customer's name and the desired channels and programs, for this function. The present invention then presents a complete program listing from the cable guide, edited as indicated.

Channel Descriptions. For this function, the CSR selects the desired channel. Detailed descriptions are then presented for each channel to allow the CSR to relate this information to the user.

Find Account/Service Availability/Bury Schedule. For this function, the CSR inputs key account identifiers. The function then presents complete account information on one screen for the indicated account. This replaces the current SAM SMS feature which locates the customer account through an address search. The older SAM approach is distracting due to inaccurate and overlapping street names. If the caller is a prospective customer, the function provides service availability, non-availability, and future bury (that is, installation) schedule information. This function also uses a clairvoyance feature, also known as a "type-ahead" function. This feature provides for faster, more accurate data entry. Each time the CSR types a letter of a particular entry, the system limits the field of search to entries encompassing only those letters typed previously for that entry.

Sale/Change Feature. This function allows the CSR to quickly identify a list of services for a customer and to make changes in current services. Embedded support tools, such as an advisor panel and a marketing banner on a CSW screen, allow the CSR to market various services of interest to the current customer. To use this function, the CSR inputs a new service option, and the screen calculates and displays totals for the new services selected.

Rate Calculator. The rate calculator allows the CSR to calculate totals for services desired by the customer. The customer inputs the desired services. The present invention then displays monthly subtotals, taxes, monthly totals, one-time fees, and the total amount for the selected services.

Rate Comparison. For this function, the CSR inputs the desired services. The function then presents information for comparison between service options selected and facilitates the customer's decision process. The function displays monthly subtotals, taxes, monthly totals, one-time fees, and a total for each option provide.

Copy. The copy function allows information to be duplicated from one option to another.

Promotions and Packages. This function displays current data on the available special promotions and packages. The CSR identifies selected services with special promotions, and then reviews specific information presented to the CSR about the service. The CSR then selects the promotional package of interest and detailed information and advertisements are provided on screen.

Sell Option. The CSR clicks a "sell 1" button to sell an indicated option 1, or a "sell 2" button to sell an option 2. As a result, the selected services are applied to the customer's account. This option may be used for any number of different options, depending upon the desired product complexity and functionality.

Collect New Account Information/Edit Account. This function allows the CSR to gather and update complete account information for the new or existing customer. The CSR inputs key account identifiers which are stored in the database of the SMS.

Credit Check. This function allows the CSR to gather customer information required to perform a credit check. The CSR inputs key financial information for the customer. The information is stored in the database for credit check purposes and a credit check is initiated. Outside information may be pulled or dialed or used via the Internet for immediate credit review, thereby reducing the number of days for approvals.

Make Payment. This function automates the credit card payment process by utilizing on-line dialing or direct Internet access. The CSR inputs credit card type, credit card number, expiration date and credit card amount, and the system obtains and displays an approval number.

Billing Inquiry/Bill Copy. For this function the CSR inputs an account identifier. The customer's billing history is accessed and displayed, including an image of a specific bill if required, then made available in image form for the customer.

Make Payment Arrangements. This function allows the CSR to record short-term payment arrangements made by the customer. The CSR inputs intended payment date and amount which is stored in the database. A link is established to the disconnect schedule database in the SMS to ensure that service is not disconnected if the arrangements are honored.

Collections. With this function, the CSR inputs key account identifiers. Information on accounts reported to collections and identification of accounts that require delinquency notices are provided in real time, for overdue accounts.

Troubleshoot. With this function, the CSR indicates the known symptoms of the current problems. The system presents the CSR with sets of possible solutions for the problems with options to obtain detailed information about each. Coaching is provided to the CSR where appropriate with each solution. A step-by-step solution for each symptom is provided by the present invention. This function reduces the number of on-site customer visits for repair and maintenance.

Report Problem. This function permits the CSR to report major problems electronically to supervisors, bulletin boards, or other necessary parties. The CSR sends a message to an appropriate mailbox. The message is displayed to the appropriate receiver.

Signal Monitor. This function allows the CSR to visually inspect exactly what the customer is viewing on the customer's television monitor. The CSR inputs a channel number into the system of an attached set-top device. The system then tunes to the monitor at the customer's head end. This allows the CSR to immediately identify the nature of the problem involved.

Request Service Order Copy. With this function, the CSR clicks on the "view order" button. The system then presents to the CSR the image of the actual selected work order. This allows the CSR to review the service order history while troubleshooting related problems.

Schedule Install and Schedule/Rescheduled Service Appointment. The CSR using this function identifies the date when service is desired. A list of available time slots based on the selected service type is presented. The function automatically schedules or reschedules service and installation calls by identifying the service type and calculating the time required to perform the service.

Account On Hold. The CSR inputs the customer name, customer account number, telephone number and description of the problem. A list of customers that are pending service is presented. This allows the CSR to maintain an electronic list of accounts that are pending service.

Disconnect. For this function, the CSR inputs the customer's telephone number or other identifier to locate the account in the SMS database. A work order is then generated for the dispatcher to schedule a disconnect service for the selected account.

CSR Performance. This function informs the CSR of the number of calls that have been taken during a requested time period, computes the average call handle time for the CSR and for the requested agent group, compares CSR performance to predetermined standards and to other agents, and calculates the revenue generated from sales. The function produces a graph performance indicators for the CSR.

Calculator. This function provides an on-line calculator for the CSR.

Notepad. This function provides an on-line notepad for the CSR.

Calendar. This function provides an on-line calendar for the CSR.

EPSS. This function provides an on-line help function, tutors, and coaches to enable the novice CSR to provide a level of service similar to that of an expert. This function presents possible CSR dialogue, hints, information, detailed hints, and training based upon the current task selected.

The present invention also provides other functions including: billing and account management functions; storage and simplified retrieval of expanded customer information; on-line prompts based on business and marketing rules;

and storage, maintenance, and simplified retrieval of information including promotions.

Further functions provided include ad hoc reporting, marketing data, automated hold queue routing, data on competitive products, outbound telemarketing, outbound collections activity, and letter and memo generation.

Some of the above functions are primarily for potential customers. General information provided would include office information, the cable guide, and channel descriptions. The service available/bury schedule would also be provided. Regarding sales, the following functions would be provided: rate calculator, rate comparison, copy, promotions and packages, and sell options. For a new account the following functions would be provided: collect new account information, credit check, make payment. The schedule install function would also be provided for potential customers.

For current customers, these functions would be provided for account billing information: find account, edit account, billing inquiries, collections, and payment arrangements. For sale/charge service the following functions would be provided: rate calculator, rate comparison, copy, promotions and packages and sell options. For trouble calls the following would be provided: troubleshoot, report problem, signal monitor, request service order, and copy. Additionally for current customers, the schedule/reschedule service appointment, account on hold, and disconnect function would be provided.

Other global functions provided to the CSR would be: CSR performance, calculator, calendar, notepad, letter generation and EPSS.

5.3 User Interfaces

The preferred embodiment of the present invention is a mouse-driven point-and-click GUI. Because this approach is new to CSRs in telecommunications services, the present invention will provide keyboard equivalents to mouse clicks as a transitional option for CSRs. The present invention uses an intuitive layout of the GUI to reduce time and effort required for the CSR to respond to the customer request. The GUI structures tasks and information to closely match the interaction between a CSR and a customer to further facilitate use. The GUI is designed to follow general user interface guidelines for the various workstation platforms, as discussed for example in the Apple "Human Interface Guidelines" or the Microsoft "Windows Interface, an Application Design Guide."

5.4 Hardware Interfaces

The GUI may be a software overlay that runs with the SMS, or may be a software application running on a separate platform with network links with the SMS. The SMS may in one embodiment be the SAM. The GUI may also have links with fleet management on UNIX workstations, and connections with services for NTSC video, program schedules, faxes, and credit card authorization.

Link to SMS and SAM. The GUI on the CSW accesses billing and other services on the SMS, or SAM, depending on the embodiment. This is done either by (1) screen emulation, or (2) structured query language ("SQL"), or (3) through an application programming interface ("API"). A physical connection may be provided through a local area network ("LAN") or wide area network ("WAN"), via a dedicated communications server which acts as a gateway to the SMS for the CSW. Access is also provided to the company's decision support system for company and outside marketing/decision data elements.

The access to the SMS is transparent to the CSR. This is done either by a structured query language such as SQL, or by use of a common API. As a result, a seamless user interface is provided with access to back-end systems. The communications server also makes the communications link transparent. This allows the LAN connection to be upgraded if desired without impacting the rest of the system.

Fleet Management on IBM UNIX. The fleet management scheduling and tracking system runs on a workstation running the AIX UNIX operating system. Most UNIX workstations support Ethernet connections, and this is a preferred architecture. Ethernet is the preferred physical connection among workstations and servers in the present invention.

Model Connections for Program Schedules, Fax, and Credit Card Authorization. The present invention in one embodiment, accesses and downloads data from various sources via dial-up modems. This includes, for example, credit card authorization systems, and television network programming schedules. CSRs may send and receive faxes directly from their workstations via a network fax server. This service is supported by one or more servers connected to the Ethernet network equipped with fax and data modems.

NTSC Video. CSRs may view one or more channels of NTSC video directly on their workstation. This is useful, for example, for troubleshooting whether an outage is system-wide or limited to a specific customer. Video may be delivered directly to a CSR monitor by two methods, including: (1) encoding video digitally and delivery by the Ethernet network, and (2) installation of a second analog network and delivery of the video to a PC interface card. The first option provides more flexibility and is the preferred embodiment. In addition to monitoring cable feeds, video sources can be recorded to disk. This enables the CSR to view training videos or promotional material. Video transmissions are bi-directional, enabling video teleconferencing. Bi-directional video transmission is not currently in the preferred embodiment of the system, due to factors of cost, network traffic, and performance, but are expected to be added to future preferred embodiments.

Automatic Call Distibution/Caller Identification. Voice communication in a customer service center is conventionally handled by existing telephone equipment. Automatic call distribution ("ACD") systems maintain a queue of incoming calls and route each call to the next available CSR. To reduce personnel requirements in this regard, caller identification automatically brings up a customer's account on the CSR screen as the call comes in. Queue monitoring can inform customers waiting on hold how many customers are waiting in the queue, and approximately how long they will have to continue on hold. Customers can use recorded information and fax back information to help troubleshoot problems without leaving their place in the queue.

5.5 Software Interfaces

SMS/SAM. The present invention accesses the SMS using one or more of the following methods:

(1) Screen emulation. This method is also known as screen scraping. This method parses the terminal screens and interprets data by field location. This approach requires no changes to the host application, but screens must be well structured for the system to be reliable.

(2) SQL query access. Where SQL access is supported, the communication server preforms queries directly to the SMS database.

(3) Application programming interface. Where an API is supported, the communications server queries the SMS directly without screen emulation.

Fleet Management. The fleet management dispatch and tracking system includes a comprehensive geographical information system ("GIS") built to run on an Oracle platform. CSRs access the GIS from the workstation to locate service technicians, and to perform other types of GIS queries. The present invention accesses the fleet management system by one or more following access methods:

(1) SQL query access. The present invention can perform the SQL queries directly to the Oracle database running under the fleet management GIS.
(2) Application programming interface. The fleet management system supports an API for requesting scheduling and tracking information from the present invention.
(3) SMS interface. The present invention can receive information through the SMS which has its own interface to the fleet management system.

Programming Schedules. CSRs may view and search network programming schedules to assist customers in locating specific program times. Programming schedules are available for downloading from several sources. The present invention schedules recurring download times, and transfers the program schedule to a local database to be queried by the CSR.

Credit Card Authorization. CSRs may perform automatic credit card authorization when they open a new customer account. The authorization bureau provides the authorization processor installed on the Ethernet network, or connected by a serial port to a server on the network. The authorization computer provides an application programming interface for credit card authorization.

Embedded Performance Support System ("EPSS"). The present invention provides CSRs with embedded performance support systems ("EPSS"). EPSS provides "just in time" training, that is, modules of training information delivered to the CSR at the moment required. In one embodiment of the present invention, EPSS uses hyperlinked on-line help, hints, prompts, computer based coaching, and tutorials tied by context to the GUI. The EPSS tracks the individual CSR's experience in performing a specific task and tailors the type of help to the CSR's individual skill level. The EPSS is implemented by tagging user interface elements on each screen with universal resource locators ("URLs") that relate to a specific topic. When the CSR requests display help, the EPSS calls up the specific topic based on the URL. The help topics are stored on a database on the EPSS server, and are retrieved by any CSR at their workstation.

5.6 Communications Interfaces

The present invention has a wide variety of communications interfaces, including data, voice, video, and radio frequencies ("RF") communications. These types of data can be carried on a variety of traditional and new communications media. These media include WAN's, LAN's, faxes, modems, cable, RF, voice, and video communications. They include wireless and hypertext systems.

Local Area Networks. One preferred embodiment of the present invention uses a high speed local area network ("LAN") that provides point to point communications between a plurality of CSW's in the system, and servers. The preferred embodiment includes LAN infrastructure for transmission of all types of data, including numerical data, voice, and video; however, it is currently cheaper to combine local area networks with other communications media carrying voice and video, including cable and telephone.

CSW's end servers in the preferred embodiment use IEEE 802.3 Ethernet protocol for communications. This is supported by all existing and proposed Sam systems. The preferred embodiment uses a 10 Base T twisted pair cable instead of 10 Base 2 coaxial cable, because of the superior ease of installation. A parallel analog video feed is preferred and can use the same RG68 cable. 10 Base 2 is preferred where maximum flexibility is required.

Ethernet provides band width of 10 MB/sec (megabytes per second), sufficient for all data communications. Where digital video over the LAN is also required, 10 MB/sec is insufficient, because a single video channel requires approximately 6 MB/sec. It is preferred to use no more than two thirds of the available band with the Ethernet protocol in any application, so a single video channel would saturate the system. A higher standard referred to as Fast Ethernet has a band with 100 MB/sec is commercially available and is the preferred embodiment where digital video on the LAN is required.

Wide Area Networks. Infrastructure available today requires that billing systems and SMS must be maintained using data modems over existing leased telephone lines. The preferred embodiment of the present invention used with the SMS converts to high speed protocols for WAN communications, providing the capacity for additional services at a later date for the SMS and the present invention. This enables CSWs and servers in separate call centers to communicate with each other directly, instead of communicating only with the SAM SMS systems. The communication server in FIG. 2 is an example of a gateway between a WAN and a local LAN. It is preferred that the WAN be provided with sufficient band width for transmitting video for teleconferencing, EPSS, and training applications.

Fax and Modem Communications. The ability for CSRs to transmit and receive faxes directly from their CSWs is preferred. Dedicated telephone lines are provided for connecting to a fax server on the LAN. Dedicated telephone lines are provided for accessing and retrieving television network programming schedules. Where the amount of traffic permits adequate time for downloading the schedules and transmitting the fax traffic load, it may be possible in specific call centers to share telephone lines between the fax and the modems.

Cable Network. An embodiment of the present invention permits the CSR to view all video channels on the cable system at the individual CSW, in addition to the video at each head end of the system. The video signals are delivered either through the Ethernet network or by a parallel analog cable network to each work station.

A distinctive feature of the present invention is that the GUI may be supported and used on a high-speed (broadband) network. Hence, not only are the combined functions of the GUI distinctive, but the GUI also uses a high-speed network which broadens and improves the functionality of the present invention. This allows the GUI of the present invention to offer, for example, Internet feeds, in further distinction with other GUI's.

The dominant architecture in the cable industry today uses a cable network that primarily carries analog video signals. However, this network architecture is anticipated to be expanded with new telecommunications capabilities. For example, the company intends to exploit the high-speed data transmission capability of its hybrid fiber optic-coaxial network. It is anticipated that the next generation of set top boxes and digital video servers for the retail cable subscriber will place greater demands on CSR's and SMS's, as more services and businesses develop with cable subscribers. Likewise, this new architecture will develop great opportunities for customer service and marketing. For this reason, the current invention is adaptable to be modified in the future to accommodate and use each subscriber set top box as a node on the customer service center LAN. Thereby, each customer's television or set top box would be fully addressable, making possible video on demand, real time television surveys, video teleconferencing with each of retail cable subscriber, and other services, such as links to home printers.

RF Communications. The fleet management tracking and scheduling system determines vehicle position using global positioning system ("GPS") satellite receivers mounted on each cable company service van. A radio transmitter on the van transmits the vehicle location developed from the GPS system, as well as other operational data, to the customer service center. All radio communications are handled through the fleet management base unit. There is no additional requirement for RF communications outside this system. The present invention accesses the fleet management system at the CSW for each CSR.

Voice Communications. The present invention includes interfaces to automatic call distribution and caller ID equipment. This includes all telephony equipment which is designed on an open system philosophy, enabling integration with equipment from outside vendors. The future embodiments should be developed so that the telephony equipment supports Ethernet interfaces and communications by well defined Application Programming Interfaces ("API"). In the preferred embodiment, the API to the ACD (Automatic Call Distribution) system is fully asynchronous. This is provided by a dedicated channel to the communication server with specific critical time response requirements.

Video Communications. Video communications in the present invention covers requirements for video to the CSR, other than delivered over the cable network. This provides video for teleconferencing among CSRs, viewing advertisements, embedded training with the EPSS, and long distance learning.

Video Teleconferencing. This is point to point video communications between the CSRs in the MSO. Existing commercially available technology enables CSRs at CSWs with CCD video camera equipment to communicate at near real time video rates. This embodiment provides an image of the CSR directly to the subscriber, enabling the subscriber set top box to receive a reserve channel which has the CSRs image.

Viewing Advertisement. CSRs may verify special promotions to which a customer is referring and view the advertisement directly on the CSW. Through the use of the company's high-speed network, the CSR can have access to promotional information distributed over a wide area network facilitating instantaneous nationwide promotions.

Embedded Training. CSRs may view training videos while not directly assisting a customer.

Distance Learning. CSRs may view a live presentation on their CSWs.

To provide these capabilities, a preferred embodiment of each CSW is equipped with a video camera, video interface card, Fast Ethernet network card, and appropriate viewing software. A video server is provided with sufficient magnetic and optical disk space to record the desired video content.

5.7 Hardware Specifications

CSW Work Station. The preferred embodiment for the CSW workstation includes capability for motion video. Hence, the preferred embodiment uses RISC processors. RISC chip technology is available from the IBM and Apple Power PC workstations. These workstations have power and performance comparable to the UNIX workstations currently available, but the Power PC stations have a lower price range comparable to standard desktop PCs. The preferred embodiment also uses a 17 inch monitor and so-called multimedia systems incorporating quad-speed CD-roms.

Servers. The preferred embodiment for the CSW has capability for fast access to data on database servers, and must have the ability to store large amounts of data including images and video. The preferred embodiment uses UNIX-based database servers with RDBMS software from Oracle. Database servers from SUN Microsystems ("SPARC"), Hewlett Packard ("HPPA"), Digital Equipment Corporation ("Alpha"), and IBM ("Power PC") are preferred for these CSW requirements.

Development Environment. The preferred development environment for the present invention for the CSW is a 3GL object oriented tool, such as C++. This will provide superior development for the GUI and EPSS functions. There are versions of C++ are available, and it is preferred that they be selected for compatibility with hardware specifications and internal standards of the user. Such standards as Open DOC are also being considered and, if possible, used as elements so that object-oriented code can be incorporated. Meeting the objectives of high portability, high performance and high functionality depends upon the development platform.

6. OTHER COMMENTS

For convenience of expression, the term telecommunications is often used herein. This means, in this specification and the claims, all telecommunications, including interactive and non-interactive telecommunications.

Although the embodiments of this invention to date involve cable television systems, the invention is readily applicable to any subscription or pay-for-view or pay-for-use telecommunications service. The invention also can be used for satellite telecommunication services, direct-to-home satellite television or telephone services, including pay-per-view services, wireless telephone services, ground line telephone services (including wired and fiber-optic systems), private phone systems, data communication systems, on-line database communication systems, and others. The invention can be used for multi-channel telecommunications services (such as cable television), for single channel multi-service subscription telecommunications services (such as is common with local wired telephone service and wireless telephones today). Furthermore, the invention can be used by new mixes of subscription or pay-for-use telecommunications services in the future, for example, telephone service offered by cable companies, or services using cable companies through the 10 million bit per second (10M bps) cable modem, or services offered by cable companies together with wireless or wired telephone, or on-line data services.

Also, the present invention can use a variety of hardware environments. For example, although the invention has to date been used only on computer networks or stand-alone computers, the invention may also be used in other computer architecture configurations, or on other types of programmable equipment.

The embodiments described herein are merely illustrative of the principles of this invention. Other arrangements and advantages may be devised by those skilled in the art without departing from the spirit and scope of the invention. Accordingly, the invention should be deemed not to be limited to the above detailed description but only by the spirit and scope of the claims which follow, and their equivalents.

Throughout the specification and the claims, for ease and clarity of description, point-and-click mouse driven GUI's are discussed. The present invention may also include GUI's with other techniques of selection, such as touch screens, light pens, cursor controls, track ball devices, voice recognition selection techniques, or other techniques. Each of these elements are means for indicating and activating functions that are graphically interfaced to the user on the GUI. Functions that may be activated may be indicated by icons, graphic representations of buttons, user bars, menus, display boxes, text, or otherwise.

"SAM" is a trademark of Continental Cablevision, Inc., of Boston, Mass.

We claim:

1. A computer system for a graphical user interface for a subscriber management system comprising:
    a. means for displaying on a computer monitor, to a plurality of customer service representative workstations, a plurality of point-and-click graphical user interface screens, each screen with a menu of icons for activating a plurality of functions, and each screen presenting data, where:
        i. the plurality of functions consist of: office information, cable guide, channel descriptions, find account/service availability/bury schedule, sale/change feature, rate calculator, rate comparison, copy, promotions and packages, sell option, collect new account information/edit account, credit check, make payment, billing inquiry/bill copy, make payment arrangements, collections, troubleshoot, report problem, signal monitor, request service order copy, schedule install and schedule/rescheduled service appointment, account on hold, disconnect, CSR performance, calculator, calendar, and EPSS,
        ii. the presented data is data consisting of: RF data, database data, billing system data, TV data, credit card authorization data, fax data, voice data, and NTSC video feed data, and
        iii. one display screen contains fields consisting of: icons, activity menus, day and time, help function, window sizing, a range of data windows, further data function, billing information, services and equipment information, view bill, payment, collection arrangement, CATV, PPV/VOD, interactive, disconnect account service, further information about view W/U and schedule, screen roll buttons, advisor information displays, advisor text call up, marketing information, and timely information,
    b. means for communicating between the means for displaying and a subscriber management system on a computer, where the means of communicating consist of: a LAN, a WAN, an NTSC video link, a digital video link, an Ethernet LAN, and a Fast Ethernet LAN, and a high-speed broadband network,
    c. means for executing the plurality of functions,
    d. means for accessing the data, and
    e. means for communicating between the means for displaying on a monitor and other elements, the elements consisting of: a video server, a fax server, a modem server adapted to TV data and credit card authorization, a database server, an EPSS server, an Arrowsmith server, and a bridge to the Internet.

2. A computer system for a graphical user interface for a subscriber management system (SMS) operating on one or more SMS computers, the system comprising:
    (a) a plurality of customer service representative workstations (CSWs), each CSW having at least one CSW computer monitor, each CSW adapted and constructed to communicate with the SMS computers;
    (b) means for displaying on a CSW computer monitor of a particular CSW of the plurality of CSWs, a plurality of point-and-click graphical user interface screens, each screen having a menu of icons for activating a plurality of functions executable on the CSW or on the SMS computer, and each screen presenting data on the respective CSW computer monitor;
    (c) means for communicating between the means for displaying and the SMS on the SMS computer,
    (d) means for executing the plurality of functions on the CSW and on said SMS computer, and
    (e) means for accessing the data in said SMS and for providing the data to the CSW, where
        a. the plurality of functions consisting of: office information, cable guide, channel descriptions, find account/service availability/bury schedule, sale/change feature, rate calculator, rate comparison, copy, promotions and packages, sell option, collect new account information/edit account, credit check, make payment, billing inquiry/bill copy, make payment arrangements, collections, troubleshoot, report problem, signal monitor, request service order copy, schedule install and schedule/rescheduled service appointment, account on hold, disconnect, CSR performance, calculator, calendar, and EPSS,
        b. the means of communicating consisting of: a LAN, a WAN, an NTSC video link, a digital video link, an Ethernet LAN, and a Fast Ethernet LAN, and a high-speed broadband network, and
        c. the presented data consisting of: RF data, database data, billing system data, TV data, credit card authorization data, fax data, voice data, and NTSC video feed data.

3. The invention in claim 2, further comprising:
    a. means for communicating between the means for displaying and other elements, the elements consisting of: a video server, a fax server, a modem server adapted to TV data and credit card authorization, a database server, an EPSS server, an Arrowsmith server, and a bridge to the Internet.

4. The invention in claim 2, where one display screen contains fields consisting of: icons, activity menus, day and time, help function, window sizing, a range of data windows, further data function, billing information, services and equipment information, view bill, payment, collection arrangement, CATV, PPV/VOD, interactive, disconnect account service, further information about view W/U and schedule, screen roll buttons, advisor information displays, advisor text call up, marketing information, and timely information.

5. A method implemented by a programmable apparatus, for providing a graphical user interface for a subscriber management system, comprising:
    a. displaying on a computer monitor, to a plurality of customer service representative representatives, a plurality of point-and-click graphical user interface screens, each screen with a menu of icons for activating a plurality of functions, and each screen presenting data, where:
        i. the plurality of functions consist of: office information, cable guide, channel descriptions, find account/service availability/bury schedule, sale/change feature, rate calculator, rate comparison, copy, promotions and packages, sell option, collect new account information/edit account, credit check, make payment, billing inquiry/bill copy, make payment arrangements, collections, troubleshoot, report problem, signal monitor, request service order copy, schedule install and schedule/rescheduled service appointment, account on hold, disconnect, CSR performance, calculator, calendar, and EPSS, ii. the presented data consists of: RF data, database data, billing system data, TV data, credit card authorization data, fax data, voice data, and NTSC video feed data, and iii. one display screen contains fields consisting of: icons, activity menus, day and time, help function, window sizing, a range of data windows, further data function, billing information, services and equipment information, view bill, payment, collection arrangement, CATV, PPV/VOD, interactive, disconnect account service, further information about view W/U and schedule, screen roll buttons, advisor information displays, advisor text call up, marketing information, and timely information, b. communicating between the means for displaying and a subscriber management system on a computer, where the means of communicating consists of: a LAN, a WAN, an NTSC video link, a digital video link, an Ethernet LAN, and a Fast Ethernet LAN, and a high-speed broadband network, c. executing the plurality of functions, d. accessing the data, and e. communicating between the means for displaying on a monitor and other elements, the elements consisting of: a video server, a fax server, a modem server adapted to TV data and credit card authorization, a database server, an EPSS server, an Arrowsmith server, and a bridge to the Internet.

6. A method implemented by a programmable apparatus, for providing a graphical user interface for a subscriber management system (SMS) operating on one or more SMS computers, the method comprising:

a. displaying on a computer monitor, to a plurality of customer service representative workstations (CSWs), each CSW adapted and constructed to communicate with the SMS computers, a plurality of point-and-click graphical user interface screens, each screen having a menu of icons for activating a plurality of functions executable on the CSW or on the SMS computer, and each screen presenting data on the respective CSW computer monitor, b. communicating between a means for displaying on a monitor and a subscriber management system on the SMS computer, c. executing the plurality of functions on the CSW and on the SMS computer, and d. accessing the data in the SMS and providing the data to the CSW, where A. the plurality of functions consisting of office information, cable guide, channel descriptions, find account/service availability/bury schedule, sale/change feature, rate calculator, rate comparison, copy, promotions and packages, sell option, collect new account information/edit account, credit check, make payment, billing inquiry/bill copy, make payment arrangements, collections, troubleshoot, report problem, signal monitor, request service order copy, schedule install and schedule/rescheduled service appointment, account on hold, disconnect, CSR performance, calculator, calendar, and EPSS, B. the means of communicating consisting of: a LAN, a WAN, an NTSC video link, a digital video link, an Ethernet LAN, and a Fast Ethernet LAN, and a high-speed broadband network, and C. the presented data comprises data types consisting of: RF data, database data, billing system data, TV data, credit card authorization data, fax data, voice data, and NTSC video feed data.

7. The invention in claim 6, further comprising:

a. communicating between the means for displaying on a computer monitor and other elements, the elements consisting of: a video server, a fax server, a modem server adapted to TV data and credit card authorization, a database server, an EPSS server, an Arrowsmith server, and a bridge to the Internet.

8. The invention in claim 6, where one display screen contains fields consisting of: icons, activity menus, day and time, help function, window sizing, a range of data windows, further data function, billing information, services and equipment information, view bill, payment, collection arrangement, CATV, PPV/VOD, interactive, disconnect account service, further information about view W/U and schedule, screen roll buttons, advisor information displays, advisor text call up, marketing information, and timely information.

9. A computer readable memory medium for causing a programmable apparatus to execute a method, comprising:

a. a computer readable memory medium, b. a computer program stored on said memory medium, c. said computer program causing a programmable apparatus to generate a graphical user interface using a method, the method comprising:

1. displaying on a computer monitor, to a plurality of customer service representative workstations, a plurality of point-and-click graphical user interface screens, each screen with a menu of icons for activating a plurality of functions, and each screen presenting data, where:

i. the plurality of functions consist of: office information, cable guide, channel descriptions, find account/service availability/bury schedule, sale/change feature, rate calculator, rate comparison, copy, promotions and packages, sell option, collect new account information/edit account, credit check, make payment, billing inquiry/bill copy, make payment arrangements, collections, troubleshoot, report problem, signal monitor, request service order copy, schedule install and schedule/rescheduled service appointment, account on hold, disconnect, CSR performance, calculator, calendar, and EPSS, ii. the presented data consists of: RF data, database data, billing system data, TV data, credit card authorization data, fax data, voice data, and NTSC video feed data, and iii. one display screen contains fields consisting of: icons, activity menus, day and time, help function, window sizing, a range of data windows, further data function, billing information, services and equipment information, view bill, payment, collection arrangement, CATV, PPV/VOD, interactive, disconnect account service, further information about view W/U and schedule, screen roll buttons, advisor information displays, advisor text call up, marketing information, and timely information, 2. communicating between the means for displaying and a subscriber management system on a computer, where the means of communicating consist of: a LAN, a WAN, an NTSC video link, a digital video link, an Ethernet LAN, and a Fast Ethernet LAN, and a high-speed broadband network, 3. executing the plurality of functions,
4. accessing the data, and
5. communicating between the means for displaying on a monitor and other elements, the elements consisting of: a video server, a fax server, a modem server adapted to TV data and credit card authorization, a database server, an EPSS server, an Arrowsmith server, and a bridge to the Internet.

10. A computer readable memory medium for causing a programmable apparatus to execute a method, comprising:

a. a computer readable memory medium,
b. a computer program stored on said memory medium,
c. said computer program causing a programmable apparatus to generate a graphical user interface using a method, the graphical user interface being from one or more customer service representative workstations (CSWs) to a subscriber management system (SMS) operating on one or more SMS computers, each CSW having at least one CSW computer monitor, each CSW adapted and constructed to communicate with the one or more SMS computers, the method comprising:
  1. displaying on a CSW computer monitor, a plurality of point-and-click graphical user interface screens, each screen having a menu of icons for activating a plurality of functions executable on the CSW or on the SMS computer, and each screen presenting data on the respective CSW computer monitor,
  2. communicating between a means for displaying on a CSW monitor and the SMS on the SMS computer,
  3. executing the plurality of functions on the CSW and on the SMS computer, and
  4. accessing the data in the SMS and providing the data to the CSW, where
    a. the plurality of functions consist of: office information, cable guide, channel descriptions, find account/service availability/bury schedule, sale/change feature, rate calculator, rate comparison, copy, promotions and packages, sell option, collect new account information/edit account, credit check, make payment, billing inquiry/bill copy, make payment arrangements, collections, troubleshoot, report problem, signal monitor, request service order copy, schedule install and schedule/rescheduled service appointment, account on hold, disconnect, CSR performance, calculator, calendar, and EPSS,
    b. the means of communicating consist of: a LAN, a WAN, an NTSC video link, a digital video link, an Ethernet LAN, and a Fast Ethernet LAN, and a high-speed broadband network, and
    c. the presented data is data consist of: RF data, database data, billing system data, TV data, credit card authorization data, fax data, voice data, and NTSC video feed data.

11. The invention in claim 10, further comprising:

a. communicating between the means for displaying on a monitor and other elements, the elements consisting of: a video server, a fax server, a modem server adapted to TV data and credit card authorization, a database server, an EPSS server, an Arrowsmith server, and a bridge to the Internet.

12. The invention in claim 10, where one display screen contains fields consisting of: icons, activity menus, day and time, help function, window sizing, a range of data windows, further data function, billing information, services and equipment information, view bill, payment, collection arrangement, CATV, PPV/VOD, interactive, disconnect account service, further information about view W/U and schedule, screen roll buttons, advisor information displays, advisor text call up, marketing information, and timely information.

* * * * *

UNITED STATES PATENT AND TRADEMARK OFFICE
CERTIFICATE OF CORRECTION

PATENT : 5,956,024

DATED : Sep. 21, 1999

INVENTOR(S) : Marshall Strickland

It is certified that error appears in the above-identified patent and that said Letters Patent is hereby corrected as shown below:

On the title page, item [73] Assignee, insert the following:

**Mediaone Group, Inc.
Englewood, CO; and**

**U S West, Inc.
Denver, CO**

Signed and Sealed this

Twenty-third Day of May, 2000

Attest:

Q. TODD DICKINSON

*Attesting Officer*　　　*Director of Patents and Trademarks*